Patented Feb. 28, 1928.

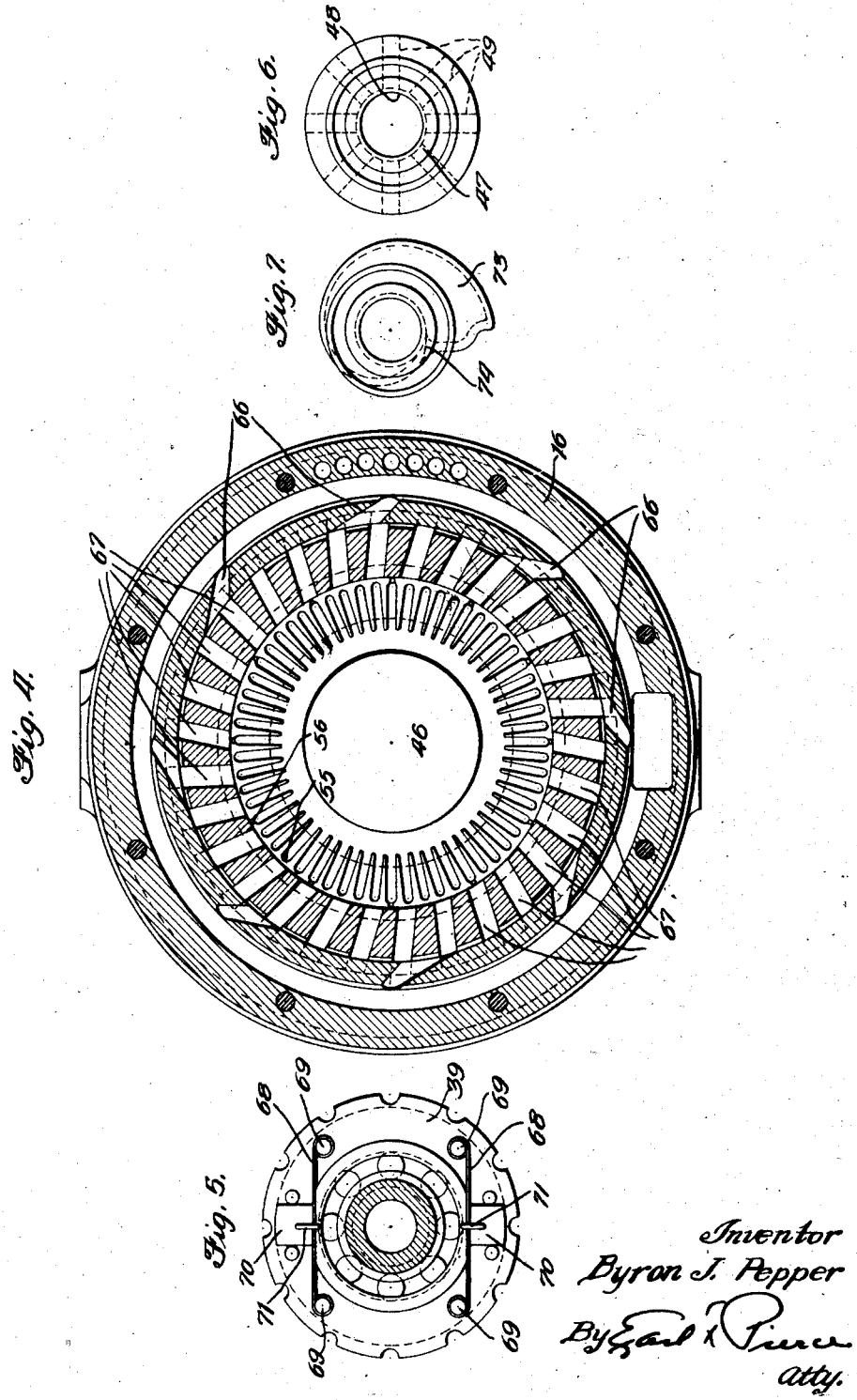

1,661,010

UNITED STATES PATENT OFFICE.

BYRON J. PEPPER, OF FORT WAYNE, INDIANA.

HEAT-TRANSFER DEVICE.

Application filed July 9, 1924. Serial No. 725,009.

My invention relates to improvements in heat transfer devices, and is particularly concerned with the provision of a novel type of heat transfer device for heating liquids, and particularly emulsions such as milk, although it is to be clearly understood that my invention is in no wise limited to this specific use.

The objects of my present invention are:

First, to provide a heat transfer device that will require a minimum amount of heating surface for heating a given quantity of liquid to a predetermined temperature and within a prescribed period of time;

Second, to provide a heat transfer device, such as described, comprising a rotatable heating chamber arranged to make use of centrifugal force for disengaging the condensed heating fluid from the surface of the heating chamber, and thus expedite the transfer of heat from the heating fluid to the contents of the heating chamber;

Third, to provide a heat transfer device, such as described, in which the same fluid that is employed for heating the liquid passing through the device is used for driving, or rotating, the rotatable portions of the mechanism;

Fourth, to provide a mechanism, such as described, in which the liquid, after being heated, does not pass in contact with extended metallic surfaces before it emerges from the heater;

Fifth, to provide a heat transfer device in combination with clarifying chambers arranged in such manner as to separate from the liquid being heated any dirt or other sediment that may be held in suspension therein, the clarifying chambers being arranged in such manner as to be easily accessible without the necessity of dissembling the machine to any considerable extent;

Sixth, to provide a heat transfer device, of the character described, in which the clarifying and heating chambers communicate with a common axial space that is sufficiently large to admit the insertion and manipulation of suitable cleaning elements;

Seventh, to provide a combined heating and clarifying apparatus that is economical to manufacture and operate but which, at the same time, requires less floor space and provides more condensing and heating surface than heaters of this type heretofore made use of, and which, at the same time, when in operation, causes less agitation of the sediment deposited from the liquid being heated and clarified;

Eighth, to provide a combined heater and clarifier of the character described, which is particularly adapted for heating and clarifying emulsions, such, for instance, as milk, in that it tends to produce a separation of the lighter and heavier portions of the milk, and causes the heavier portions to be held in contact with the heating surface while the lighter portions are separated from the heating surface or surfaces by the heavier portions. This is of particular importance in the heating and clarifying of milk, inasmuch as it is well known that subjecting the cream or lighter portion of the milk to heat tends to destroy the cream line. In common with this object, my invention comprises a method of heating emulsions in such manner as to prevent the over-heating of the lighter portion or portions of such emulsion.

Ninth, to provide a heater in which steam is used for heating the liquid to be heated, and of such construction that there is no possibility of the steam or the water of condensation from such steam becoming mixed with and contaminating or diluting the liquid to be heated;

Tenth, to provide a heat transfer device of the rotary type, in which the heating fluid is used for driving the rotary part, but in which the speed of the rotary part is independent of the quantity of heating fluid passing through the device. This makes it possible, independently, to control the quantity of fluid passing through the device and the quantity of heating fluid employed, so that any desired temperature, within the range of the apparatus, can be imparted to the fluid to be heated.

Other objects of my invention, such as simplicity and economy of manufacture, ease of operation and control, and efficiency, will appear as this description progresses, reference being had to the acompanying drawings, in which Figure 1 is a central, vertical section through my improved heat transfer device;

Figure 4 is a transverse section taken on the line 4—4 of Figure 3;

Figure 5 is a section taken on line 5—5 of Figure 3, showing certain details of construction of the speed control mechanism;

Figure 6 is an end elevation of the distributor that controls the discharge of milk to the inlet end of the device; and Figure 7 is an end elevation of the scoop for removing the heated fluid from the heating device.

Throughout the several views similar reference characters are used for referring to similar parts, and the several sections are taken looking in the directions of the small arrows.

Figure 1:
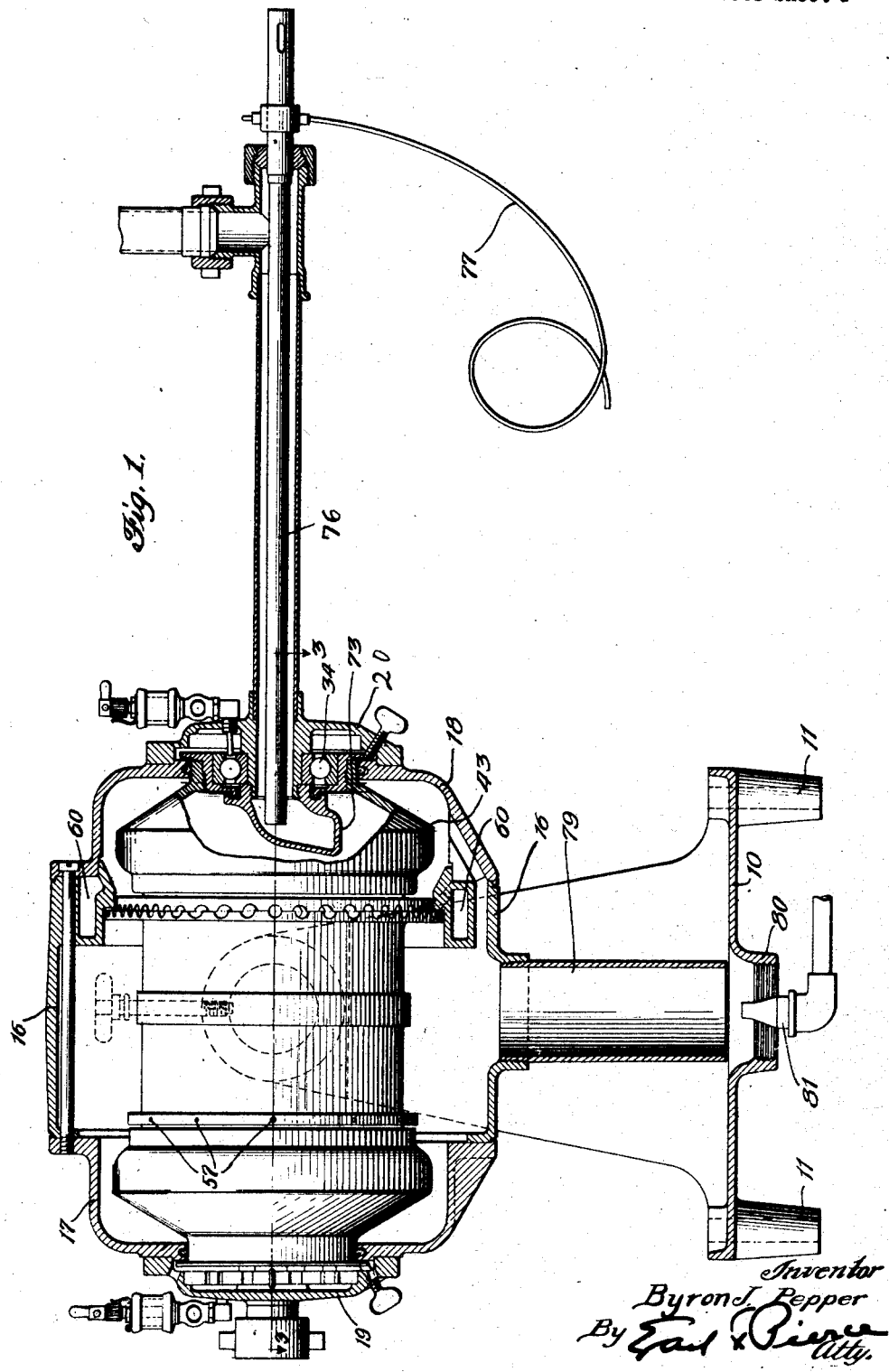

Referring to the drawings, my improved heat transfer device comprises the base plate 10 that may be secured to the floor, or any other suitable support, by means of bolts passing through the openings 11. This base plate comprises a pair of oppositely disposed pedestals 12 that support the bearings 13 at their upper ends. These bearings receive and support the hollow trunnions 14 and 15. These trunnions 14 and 15 project from the sides of the cylindrical housing 16, the opposite ends of which are closed by the cup-shaped caps 17 and 18. These caps are provided with central openings that are closed by the cover plates 19 and 20, respectively. The cover plate 19 has a hollow hub 21, formed integrally therewith, that may be connected by a suitable union 22 with a pipe for conveying the fluid to be heated to the heating device. The cover plate 19 is secured to the cap 17 by screws 23 extending through suitable openings in the cover plate, and having the inner ends threaded into the cap 17. The outer ends of these screws are provided with suitable knurled heads 24, by which they can be easily screwed into or out of the cap 17.

The inner end of the hollow hub 21 serves as a support for the anti-friction bearing comprising the two races 25 and 26 and the anti-friction elements 27.

The opening in the cap 18 is closed by another cover plate 28 that is secured in place by means of screws 29, similar to the screws 23 described above. This cover plate also comprises a central hollow hub 30, to the outer end of which is connected a pipe or conduit 31 for conducting the heated fluid away from the heat transfer device. The inner end of the hub 30 supports another pair of races 32 and 33, between which are confined the anti-friction elements 34.

A drum, denoted as a whole by the reference character D, and comprising the central cylindrical portion 35 and the two end portions 36 and 37, is rotatably mounted in the housing formed by the cylindrical portion 16 and the two caps 17 and 18. For this purpose, the end portion 36 is provided with a hollow trunnion 38 into which is threaded the ring 39 that receives the race 26. In a similar manner the end portion 37 is provided with a hollow trunnion 40 into which is threaded the ring 41 for receiving the race 32.

From the above description it will be seen that the drum D is rotatably supported by the inner portions of the hubs 21 and 30 of the end plates 19 and 20, respectively.

The end portions 36 and 37 have the annular chambers 42 and 43, respectively, formed therein. These chambers extend outwardly beyond the inner wall of the cylindrical portion 35 for receiving the sediment separated from the liquid being clarified and heated. These end portions 36 and 37 are secured to the opposite ends of the cylindrical portion 35 by means of the screw-threaded connections 44 and 45, or in any desired manner.

Figure 3:
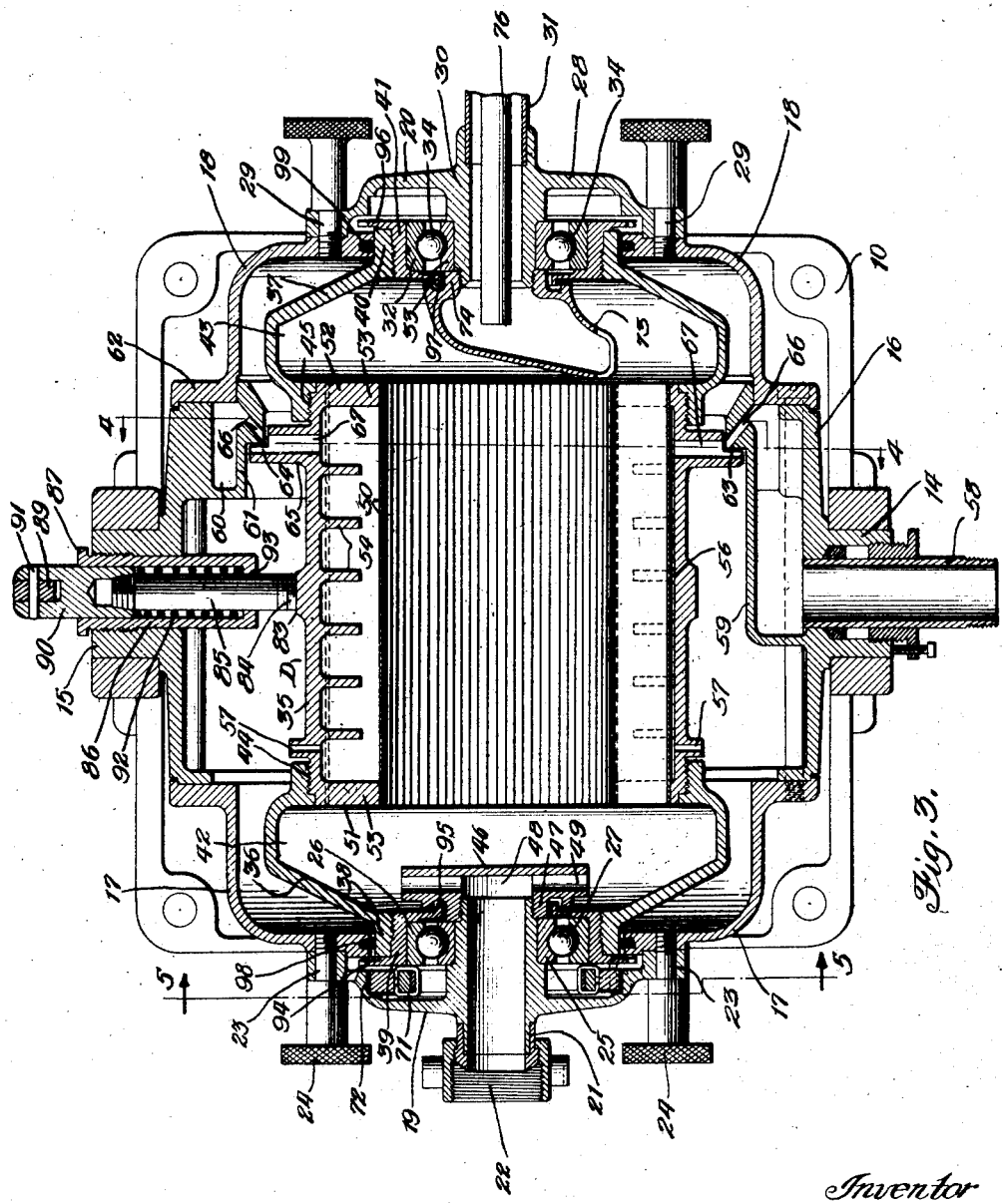
Figure 3 is a horizontal section taken on line 3—3 of Figure 1, portions thereof being broken away.

The fluid to be heated is discharged into the annular chamber 42, through the circular discharge device 46 (see Figures 3 and 6.) The outer face of this discharge device is provided with a threaded sleeve 47 that threads upon the inner end of the hub 21. The device 46 is provided with a central bore 48 and the radially extending passageways 49 for conducting the fluid to be heated from the hub 21 into the annular chamber 42.

A corrugated cylinder 50 of thin sheet metal is mounted in the central portion 35 of the drum D. The end portions of the cylinder 50 are supported by the end rings 51 and 52 of the cylindrical portion 35. These rings are provided with inwardly projecting lugs, or teeth, 53 that project into the convolutions of the cylinder 50 and are hermetically secured thereto by brazing, soldering, or any other desired manner, so as to prevent the escape of fluid between the rings 53 and the ends of the cylinder 50. The cylindrical portion 35 of the drum D is further provided with rows of aligned lugs 54 that project into the spaces between the adjacent convolutions of the drum D so as to provide supports for the sides of the convolutions or corrugations. These lugs 54 are shorter than the spaces between the convolutions of the drum so as to permit the ready passage of heating fluid the entire length of the cylindrical portion 35 of the drum D. The lugs 54 perform the further function of acting as baffles for preventing the too rapid passage of heating fluid through the heating element.

The circumferential rows of lugs 54 are connected by annular webs 55 that support the outer bends or bottoms of the convolutions in spaced relation to the drum D, so as to provide annular passage ways between the drum D and the corrugated cylinder 50 for the passage of steam and water. Aligned notches 56 are cut in the webs 55 at intervals to provide passage ways for permitting the steam and water to drain out of the drum D through a plurality of radially extending ports 57 formed at one end of the drum D.

In the embodiment of my invention disclosed herein, I make use of steam for heating the cylinder 50 and for rotating the drum D. This steam enters the apparatus through the pipe 58 that is secured in the hollow trunnion 14 and discharges into the chamber 59, formed integrally with the cylindrical housing 16, and communicating with the annular chamber 60 that is formed by the ring 61, cast integrally with the cylindrical casing 16, and the flange 62 of the cap 18. The ring 61 has an inwardly extending angular flange 63, fitting closely into the annular rabbet 64 formed in the flange 65 that projects outwardly from the drum D. Expanding nozzle ports 66 are formed in the angular portion 63 of the ring 61 for discharging the steam into the turbine ports 67 in the ring 65.

The steam thus supplied to the turbine ring 65 of the drum D will cause the latter to rotate at a high rate of speed. It will be apparent that the rate at which the milk or other fluid passes through the corrugated cylinder will depend, among other things, upon the rate of rotation of the drum D. The quantity of steam required to rotate the drum D at any given speed will not ordinarily be sufficient to heat the liquid through a very large range of temperature, and I therefore provide means for limiting the speed of the drum D, and at the same time enabling the operator to pass a larger quantity of steam through the device than is necessary to obtain this speed of the drum D. For this purpose I make use of a centrifugal brake mechanism comprising the two leaf springs 68 (see Figure 5) that are secured to the ring 39 by means of the pins 69. Fibre brake blocks 70 are secured to the central portions of the springs 68 by means of the wire rings 71. The outer faces of these blocks are adapted frictionally to engage the annular surface 72 formed on the inner side of the cover plate 19 when the speed reaches a predetermined value. By such means I can hold the drum D to a predetermined speed, and at the same time, pass more steam through the turbine ring than is required to rotate the drum D at that speed.

The heated milk is removed from the annular chamber 43 by means of the scoop 73 that extends in a direction opposite to the direction of rotation of the drum D and terminates in the sleeve 74 that is threaded upon the innner end of the hub 30. In passing through the drum D, the milk, or other liquid being heated, acquires a very considerable tangential velocity and when it strikes the scoop 73 its momentum causes it to be discharged through the hub 30 and into the pipe 31 to any desired receptacle which may be located several feet above the scoop 73, inasmuch as the velocity of the milk is sufficient to elevate it several feet.

For controlling the temperature of the heated milk I prefer to make use of a thermally operated valve located in the steam line. This valve is shown at 75. A thermal element 76, the inner end of which projects into the scoop 73, and the outer end of which is connected by means of the conduit 77 with the pressure element 78 that operates the valve 75, controls the passageway in this valve so as to insure a constant predetermined temperature to the issuing milk, or other fluid. Any suitable thermally controlled valve may be used, the one here shown being sold upon the market under the trade name "Sarco".

By placing the thermal element 76 of the valve 75 in the position shown, the liquid, upon leaving the heater, contacts with this thermal element before it has a chance to become cooled. Furthermore, any change in the temperature of the issuing liquid causes a substantially immediate operation of the valve 75.

The steam, upon entering the drum D, contacts with the outer walls of the corrugated cylinder 50 and the heat from this steam is transmitted to the liquid or fluid passing through this cylinder. As the steam is condensed upon the walls of the cylinder it is immediately discharged, because of the centrifugal force to which it is subjected, and by thus providing means for displacing the condensed steam from the outer surface of the cylinder 50, I am enabled very greatly to increase the rate at which heat can be transferred to the liquid to be heated. As the liquid passes through the corrugations of the cylinder and there becomes heated cooler portions of the liquid displace the warm portions because of the accompanying decrease in density as the liquid is heated. This displacement of the warmer portions of the liquid by the cooler exists throughout the entire corrugated portion of the cylinder because of the presence of intense centrifugal force caused by the high rotation of the cylinder. In so far as this movement of liquid is concerned, the force of gravity may be disregarded.

Considering each radial depressed portion of the corrugations in the cylinder separately, it is found that the cooler liquid moves outwardly from the mass to the inner end of the depression along that surface facing the direction of rotation, and the warmer portion moves back toward the mass along the opposite surface of the depression. The acceleration of the liquid as it moves first along one wall or surface of the depression then back along the other, depends upon the centrifugal force exerted upon the liquid and the differences in density between the warmer and cooler portions which, of course, are acted upon by the centrifugal force in degrees proportionate to their specific gravity. As the cooler liquid enters the depressed portion, its velocity in the direction of rotation of the drum must be increased or accelerated in its movement toward the inner end of the depression. This acceleration is brought about by the contact of the adjacent surface of the depression with the liquid, which drives the immediate portions of the liquid in the direction of rotation of the drum. When the liquid has reached the innermost end of the depression and starts back along the opposite surface, its velocity in the direction of rotation of the cylinder is slightly greater than the adjacent portion of the depression surface. This condition causes the liquid to move closely along that surface of the depression, its rotational speed being constantly diminished as it moves toward the axis of rotation. There is thus a scouring action of the entire inner surface of the depressed portion of the corrugation by the liquid as it travels thereover.

In heating emulsions, such, for instance, as milk, the centrifugal force will tend to throw the heavier portions of the emulsions into contact with the walls of the convolutions or corrugations and to force the lighter components of the emulsions into the interior of the cylinder where they will not be subjected to the intense heat of the cylinder walls. In this manner, and by the means described, I am enabled to heat milk without destroying its cream line.

The steam and water issuing from the drum D flow down around the inner walls of the cylindrical casing 16 and pass out through the drain pipe 79 and the opening 80 in the bottom of the base plate 10. If the amount of uncondensed steam issuing is objectionable, a cold water jet 81 may be used for further condensing it.

For enabling the operator quickly to bring the drum to rest after the heater has been in operation, I provide the drum D with the annular brake surface 83 that is engaged by the brake block 84 carried by the inner end of the rod 85. This rod is reciprocably mounted in the sleeve 86 that is held in the hollow trunnion 15 by means of the follower 87. The follower 87 has a bracket 88 formed integrally therewith upon which is pivotally mounted the lever 89. This lever is pivotally connected with the cap 90 in the inner end of which the rod 85 is secured. The pivot pin 91 works loosely in the lever 89 so as to permit rectilinear movement of the rod 85. A spring 92, confined between the cap 90 and the flange 93, at the inner end of the sleeve 86, provides means for holding the brake block 84 out of contact with the brake surface 83 during the normal operation of the heater. When the operator desires to arrest the rotation of the drum D, he simply presses inwardly upon the outer end of the lever 89, thereby bringing the brake block 84 into frictional contact with the surface 83 and thus stopping the movement of the drum D.

For preventing leakage of the fluid being heated, and of the heating fluid between the several relatively rotatable parts, I provide the flanges 94 and 95 on the ring 39 and the flanges 96 and 97 on the ring 41. In addition, I prefer to make use of gaskets 98 and 99 carried by the inner edges of the caps 17 and 18, respectively. These gaskets prevent the escape of steam between the caps and the adjacent portions of the rotating drum.

Figure 2:
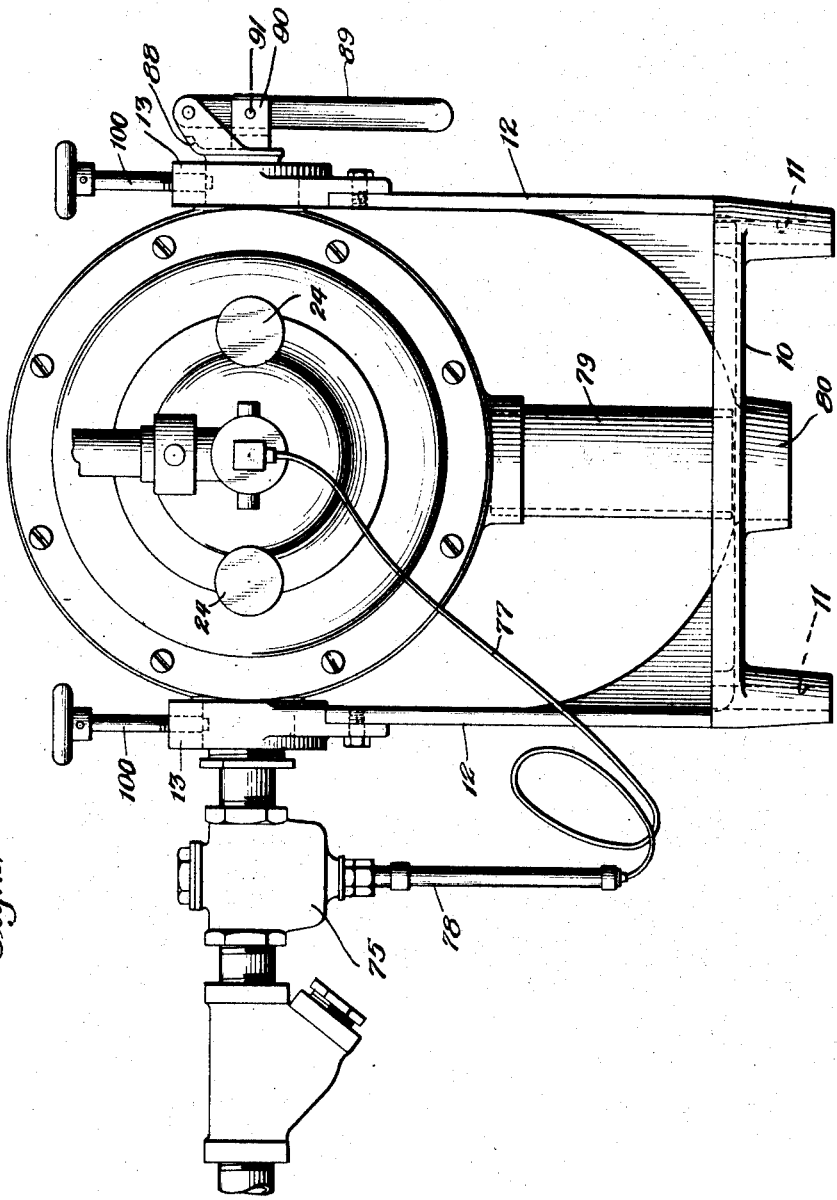
Figure 2 is an end elevation.

When it is desired to clean my improved heat transfer device, the two end plates 19 and 20 can be removed along with the parts associated therewith, and one of these end plates can be replaced by a simple cap forming a tight connection with either the trunnion 38 or the trunnion 40, and the housing can then be rotated upon its trunnions until it occupies a vertical position, in which position it can be held by means of the set screws 100 (see Figure 2). The interior of the drum, or rather of the cylinder 50, and the two annular chambers 42 and 43, can be filled with a suitable cleansing solution that can be permitted to remain for several hours or over night. Thereafter, this cleansing solution can be drained from the apparatus and the operator can, by inserting the nozzle of a hot water pipe or housing, or a steam jet, into the interior of the drum, thoroughly cleanse and sterilize all portions of the apparatus that contact with the fluid to be heated.

While I have described the details of construction of the preferred embodiment of my improved heat transfer device and the method of heating that I am enabled to perform by means of it, it is to be clearly understood that my invention is not limited to these details of construction, but is capable of other adaptations and modifications within the scope of the appended claims.

Having thus described my invention, what I claim is:

1. A heat transfer device comprising a rotatable drum having a central cylindrical portion and end portions provided with aligned trunnions, said cylindrical portion having a series of discharge openings adjacent one end, said end portions each having an inwardly opening annular channel extending outwardly beyond said cylindrical portion, a pipe extending through one of said trunnions for supplying liquid to one of said annular channels, a conduit extending through the other of said trunnions and terminating in a scoop for removing liquid from the other of said channels, a longitudinally corrugated cylinder positioned within said cylindrical portion of said drum and co-acting therewith to form a steam chamber surrounding said corrugated cylinder, baffles positioned between the outer walls of said corrugations, a turbine ring at one end of the cylindrical portion of said drum and having a series of openings discharging into said steam chamber, a housing surrounding said cylindrical portion and spaced therefrom, said housing having an exhaust pipe, a jet ring carried by one end of said housing and having a series of openings communicating with the series of openings in said turbine ring, and means for conducting steam to said jet ring.

2. A heat transfer device comprising a rotatable drum having a central cylindrical portion and end portions provided with aligned trunnions, said cylindrical portion having a series of discharge openings adjacent one end, said end portions each having an inwardly opening annular channel extending outwardly beyond said cylindrical portion, a pipe extending through one of said trunnions for supplying liquid to one of said annular channels, a conduit extending through the other of said trunnions for removing liquid from the other of said channels, a longitudinally corrugated cylinder positioned within said cylindrical portion of said drum and co-acting therewith to form a steam chamber surrounding said corrugated cylinder, a turbine ring secured to one end of the cylindrical portion of said drum and having a series of openings discharging into said steam chamber, a housing surrounding said cylindrical portion and spaced therefrom, a jet ring carried by one end of said housing and having a series of oppositely inclined openings communicating with the series of openings in said turbine ring, and a steam inlet pipe communicating with said jet ring.

3. A heat transfer device comprising a rotatable drum having a central cylindrical portion and end portions provided with aligned trunnions, said cylindrical portion having a series of discharge openings adjacent one end, said end portions each having an inwardly opening annular channel extending outwardly beyond said cylindrical portion, a pipe extending through one of said trunnions for supplying liquid to one of said annular channels, a conduit extending through the other of said trunnions for removing liquid from the other of said channels, a longitudinally corrugated cylinder positioned within said cylindrical portion of said drum and co-acting therewith to form a steam chamber surrounding said corrugated cylinder, a turbine ring secured to one end of the cylindrical portion of said drum and having a series of openings discharging into said steam chamber, a housing surrounding said cylindrical portion and spaced therefrom, a jet ring carried by one end of said housing and having a series of openings communicating with the series of openings in said turbine ring, a single valve for supplying steam to said jet ring, and a pipe for supplying steam to said valve.

4. A heat transfer device comprising a rotatable drum having a central cylindrical portion and end portions provided with aligned trunnions, said cylindrical portion having a series of discharge openings adjacent one end, said end portions each having an inwardly opening annular channel extending outwardly beyond said cylindrical portion, a pipe extending through one of said trunnions for supplying liquid to one of said annular channels, a conduit extending through the other of said trunnions for removing liquid from the other of said channels, a longitudinally corrugated cylinder positioned within said cylindrical portion of said drum and co-acting therewith to form a steam chamber surrounding said corrugated cylinder, a turbine ring secured to one end of the cylindrical portion of said drum and having a series of openings discharging into said steam chamber, a housing surrounding said cylindrical portion and spaced therefrom, a jet ring carried by one end of said housing and having a series of openings communicating with the series of openings in said turbine ring, and a steam inlet pipe communicating with said jet ring.

5. A heat transfer device comprising a rotatable drum having a central cylindrical portion and end portions provided with aligned trunnions, said cylindrical portion having a discharge opening adjacent one end, said end portions each having an inwardly opening annular channel extending outwardly beyond the inner wall of said cylindrical portion, means extending through one of said trunnions for supplying liquid to one of said annular channels, means extending through the other trunnion for removing liquid from the other annular channel, a longitudinally corrugated cylinder located in said cylindrical portion and forming therewith a steam chamber, means for supplying steam to one end of said steam chamber comprising a turbine structure for rotating said drum, and a housing surrounding said cylindrical portion for receiving the discharge from said discharge opening.

6. A heat transfer device comprising a rotatable drum having a central cylindrical portion and end portions provided with aligned trunnions, said cylindrical portion having a discharge opening, said end portions each having an inwardly opening annular channel extending outwardly beyond the inner wall of said cylindrical portion, means extending through one of said trunnions for supplying liquid to one of said annular channels, means extending through the other trunnion for removing liquid from the other annular channel, a longitudinally corrugated cylinder located in said cylindrical portion and forming therewith a steam chamber, and means for supplying steam to said steam chamber comprising a turbine structure for rotating said drum.

7. A heat transfer device comprising a rotatable drum having a central cylindrical portion and end portions provided with aligned trunnions, said cylindrical portion having a discharge opening, said end portions each having an inwardly opening annular channel, means extending through one of said trunnions for supplying liquid to one of said annular channels, means extending through the other trunnion for removing liquid from the other annular channel, a cylinder located in said cylindrical portion and forming therewith a steam chamber, and means for supplying steam to said steam chamber.

8. A heat transfer device comprising a rotatable drum having a central cylindrical portion and end portions provided with aligned trunnions, means for supplying liquid to one of said end portions through one of said trunnions, means for removing liquid from the other of said end portions through the other of said trunnions, a cylinder having deep radial recesses extending longitudinally thereof located in said cylindrical portion and forming a steam chamber therewith, and means for supplying steam to said steam chamber.

9. A heat transfer device comprising a rotatable drum having a central cylindrical portion and end portions, means for supplying liquid to one of said end portions, means for removing liquid from the other of said end portions, a cylinder having deep radial recesses extending longitudinally thereof located in said cylindrical portion and forming a steam chamber therewith, and means for supplying steam to said steam chamber.

10. A heat transfer device comprising a rotatably mounted cylinder having deep radial recesses extending longitudinally thereof, means for supplying liquid to one end of said cylinder, means for removing liquid from the other end of said cylinder, and means for heating said cylinder.

11. A heat transfer device comprising a rotatably mounted drum, a corrugated cylinder in said drum forming a steam chamber with said drum, baffle plates between said drum and said cylinder for supporting said corrugations, and means for supplying steam to one end of said steam chamber.

12. A heat transfer device comprising a rotatably member including a clarifying chamber and a heating chamber communicating with a common axial space, the end portions of said rotatable member having openings formed therein to permit easy access to said chambers.

13. A heat transfer device comprising two co-axial chambers, means for rotatably mounting said chambers, and means for heating one of said chambers, one of said chambers being provided with an end wall having an opening formed therein for giving access to both of said chambers.

14. A heat transfer device comprising a housing having trunnions projecting from opposite sides thereof, bearings for said trunnions, a drum rotatably mounted in said housing and having a peripheral brake surface, a brake for engaging said surface, and means extending through said housing for engaging said brake with said brake surface.

15. A heat transfer device comprising a housing, a drum rotatable in said housing, said drum having a pair of co-axial trunnions, anti-friction bearings in said trunnions, and a pair of end plates for said housing, each of said end plates including a trunnion projecting into and supporting the adjacent anti-friction bearing.

16. A heat transfer device comprising a housing, a drum rotatable in said housing, said drum having a pair of co-axial trunnions, anti-friction bearings in said trunnions, and a pair of end plates for said housing, each of said end plates including means for supporting the adjacent anti-friction bearing.

17. A heat transfer device comprising a housing, a drum rotatably mounted in said housing, a turbine ring secured to said drum and having one corner cut away to form a groove, and a jet nozzle for discharging a driving fluid into said groove.

18. A heat transfer device comprising a rotatable drum having a central cylindrical portion and end portions, said end portions being each formed to provide an annular pocket of greater diameter than said central cylindrical portion, means for supplying liquid to one of said end portions, means for removing liquid from the other of said end portions, a cylinder located in said cylindrical portion and forming a steam chamber therewith, and means for supplying steam to said steam chamber.

19. A heat transfer device comprising a rotatable drum having a central cylindrical portion and end portions, said end portions each being formed to provide an annular pocket of greater diameter than said central cylindrical portion, said end portions having aligned trunnions, means for supplying liquid to one of said end portions through one of said trunnions, means for removing liquid from the other of said end portions through the other of said trunnions, a cylinder located in said cylindrical portion and co-acting therewith to form a steam chamber, and means for supplying steam to said steam chamber.

In witness whereof, I hereunto subscribe my name, this 28 day of June, 1924.

BYRON J. PEPPER.